United States Patent
Schunk

(10) Patent No.: US 8,998,504 B2
(45) Date of Patent: Apr. 7, 2015

(54) USER-CONFIGURABLE OPTICAL FIBER LINK

(71) Applicant: Avago Technologies General IP (Singapore) Pte. Ltd., Singapore (SG)

(72) Inventor: Nikolaus W. Schunk, Maxhuette-Haidhof (DE)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 23 days.

(21) Appl. No.: 13/772,515

(22) Filed: Feb. 21, 2013

(65) Prior Publication Data

US 2014/0233894 A1  Aug. 21, 2014

(51) Int. Cl.
*G02B 6/36* (2006.01)
*G02B 6/46* (2006.01)

(52) U.S. Cl.
CPC ...... *G02B 6/36* (2013.01); *G02B 6/46* (2013.01)

(58) Field of Classification Search
CPC .. G02B 6/3636; G02B 6/3652; G02B 6/3839; G02B 6/3885; G02B 6/46
USPC .......... 385/55, 60, 72, 78, 88–92, 83
See application file for complete search history.

(56) References Cited

U.S. PATENT DOCUMENTS

| | | | | |
|---|---|---|---|---|
| 5,566,269 A * | 10/1996 | Eberle et al. | ............ | 385/137 |
| 5,712,940 A * | 1/1998 | Van Roemburg et al. | ...... | 385/93 |
| 6,540,412 B2 * | 4/2003 | Yonemura et al. | ............ | 385/88 |
| 6,661,569 B2 * | 12/2003 | Yoon et al. | ............ | 359/333 |
| 6,973,252 B2 * | 12/2005 | Doss et al. | ............ | 385/137 |
| 7,213,980 B2 * | 5/2007 | Oki et al. | ............ | 385/92 |
| 7,488,115 B2 | 2/2009 | Theis | | |
| 8,033,740 B2 * | 10/2011 | Koreeda et al. | ............ | 385/65 |
| 8,376,630 B2 * | 2/2013 | Wang et al. | ............ | 385/78 |
| 8,783,968 B2 * | 7/2014 | Adams | ............ | 385/77 |
| 2006/0093304 A1 * | 5/2006 | Battey et al. | ............ | 385/135 |
| 2011/0044590 A1 * | 2/2011 | Kachmar | ............ | 385/83 |
| 2011/0243508 A1 * | 10/2011 | Koreeda et al. | ............ | 385/78 |
| 2013/0034333 A1 * | 2/2013 | Holmberg et al. | ............ | 385/135 |
| 2013/0136401 A1 * | 5/2013 | Cooke et al. | ............ | 385/80 |

OTHER PUBLICATIONS

Fiber Optic Connector Tutorial. Fiber Optics for Sale Co. [online]. [retrieved on Jan. 15, 2013]. Retrieved from the Internet: <http://www.fiberoptics4sale.com/Merchant2/fiber-optic-connectors.php>.

* cited by examiner

*Primary Examiner* — Ellen Kim

(57) ABSTRACT

An optical fiber connector includes a connector body and a submodule having a user-selectable configuration, such as a splitter or coupler. The connector body has a submodule mounting region. A first end of the connector body has a pluggable optical fiber port. A second end of the connector body has at least one body fiber guide. The submodule is releasably mounted in the submodule mounting region. The submodule has at least one submodule fiber guide aligned with at least one body fiber guide and at least one submodule fiber guide aligned with the pluggable optical fiber port. One or more optical fibers are routed through the connector body in accordance with the submodule configuration.

12 Claims, 15 Drawing Sheets

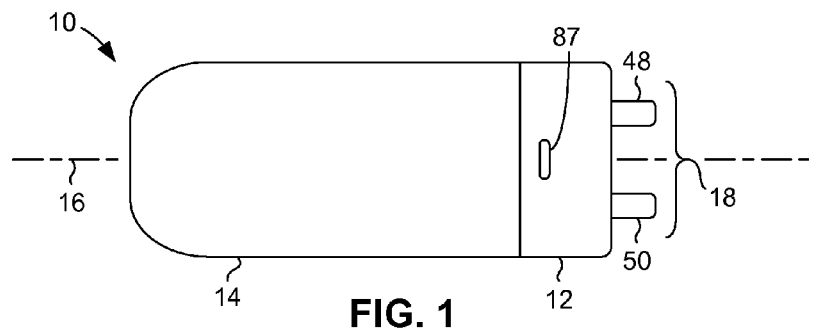
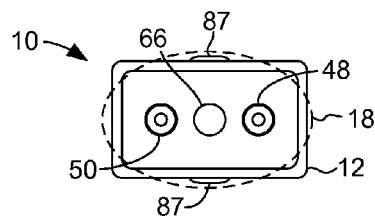 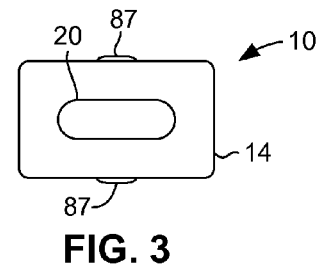
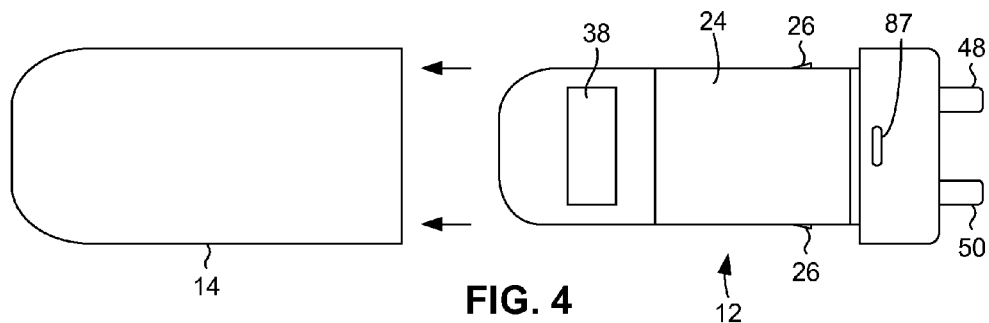
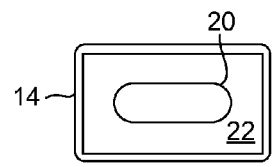

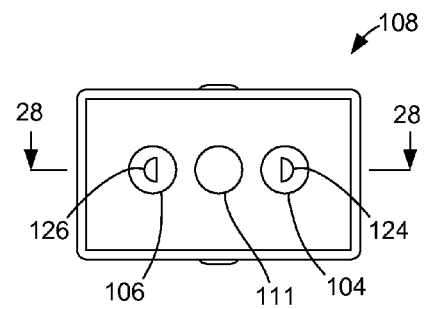
FIG. 27
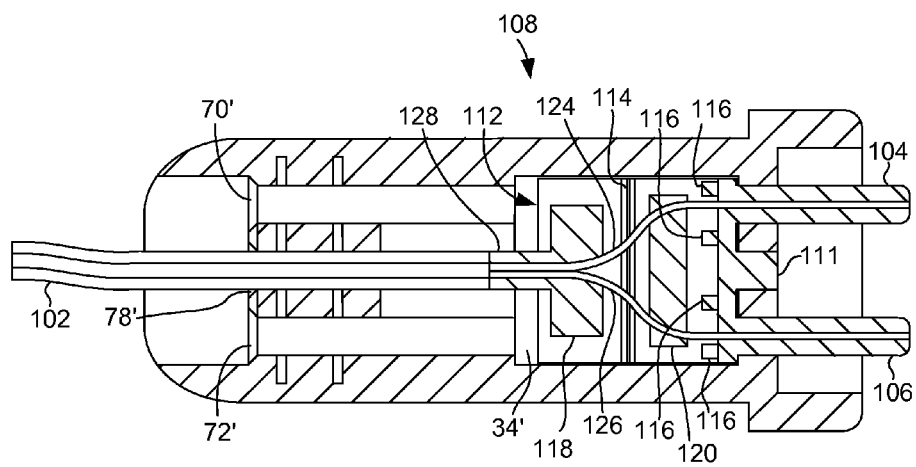
FIG. 28
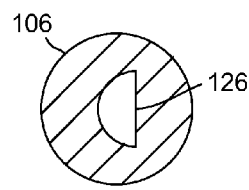 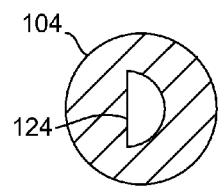
FIG. 29A  FIG. 29B

USER-CONFIGURABLE OPTICAL FIBER LINK

BACKGROUND

In data communication systems, it is often useful to modularize interface electronics and other interface elements in a data communication module. For example, in an optical data communication system, an opto-electronic transceiver module may include a light source such as a laser that converts electrical signals to optical signals, and a light detector such as a photodiode that converts optical signals to electrical signals. A transceiver module commonly also includes driver and receiver circuitry associated with the laser and photodiode. To use such an opto-electronic transceiver module, an optical fiber cable is plugged into or otherwise connected to a port in the module. Such an opto-electronic module also includes electrical contacts that can be coupled to an external electronic system, such as a switching system or processing system.

Common opto-electronic module configurations include those known as Small Media Interface (SMI) and F05. This family of opto-electronic modules is characterized in part by generally elongated housings with generally rectangular cross-sectional profiles. One end of the housing includes a fiber receptacle to which a mating fiber plug can be connected. The mating fiber plug commonly terminates one or more plastic optical fibers and has one or more corresponding ferrules protruding from it. The ends of the fibers are retained within the ferrules. The ferrules plug into corresponding recesses in the module housing. In an SMI fiber plug, the fibers are retained in grooves in the plug body and secured with a metal fiber clamp having prongs that extend into slots in the plug body. As the clamp is placed over the fibers, the edges of the prongs cut into the buffer coating on the fiber to hold the fibers in place. Once the fibers are clamped in this manner, the plug body is inserted into a plug cover to prevent the clamp from being displaced and to otherwise secure the assembly.

In the context of SMI and F05 module families, the term "fiber link" is sometimes used to refer to the combination of a fiber plug and the opto-electronic module to which the fiber plug can be connected.

In optical fiber networks, various optical devices can be provided to facilitate routing optical signals to and from opto-electronic modules. An optical device having one input fiber and two output fibers is referred to as a splitter. Similarly, an optical device having two input fibers and one output fiber is referred to as a coupler. Splitters and couplers for plastic optical fibers are commonly formed by bonding portions of two fibers having D-shaped, i.e., semicircular, profiles together.

SUMMARY

Embodiments of the present invention relate to a user-configurable optical fiber link that includes an optical fiber connector.

In an exemplary embodiment, an optical fiber connector comprises a connector body and a submodule. The connector body is elongated in a direction of a longitudinal axis between a first end and a second end. The connector body has a submodule mounting region between the first end and the second end. The first end of the connector body has a pluggable optical fiber port. The second end of the connector body has at least one body fiber guide. The submodule is releasably mounted in the submodule mounting region. That is, a user can readily mount the submodule in the submodule mounting region as well as release it from the submodule mounting region in a manner that does not involve fasteners or tools. The submodule has at least one submodule fiber guide aligned with at least one body fiber guide. The submodule also has at least one submodule fiber guide aligned with the pluggable optical fiber port.

In the exemplary embodiment, a method for connecting a fiber network having at least one optical fiber using the above-described connector comprises selecting a submodule from among a plurality of selectable submodule types, mounting the submodule in the submodule mounting region, securing a release mechanism to secure the submodule in the submodule mounting region, and installing at least one optical fiber along a continuous optical path. The continuous optical path includes at least one body fiber guide, at least one submodule fiber guide, and the pluggable optical fiber port.

Other systems, methods, features, and advantages will be or become apparent to one with skill in the art upon examination of the following figures and detailed description. It is intended that all such additional systems, methods, features, and advantages be included within this description, be within the scope of the specification, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

FIG. 1 is a top plan view of an optical fiber connector, in accordance with an exemplary embodiment of the invention.

FIG. 2 is a forward end elevation view of the optical fiber connector of FIG. 1.

FIG. 3 is a rearward end elevation view of the optical fiber connector of FIG. 1.

FIG. 4 is a top plan view illustrating assembly of the body portion and the cover portion of the optical fiber connector of FIGS. 1-3.

FIG. 5 is an end elevation view showing the interior of the cover portion of the optical fiber connector of FIGS. 1-3.

FIG. 27 is a forward end view of the body portion of FIG. 26.

FIG. 28 is a sectional view taken on line 28-28 of FIG. 27.

FIG. 29A is sectional view taken on line 29A-29A of FIG. 26.

FIG. 29B is sectional view taken on line 29B-29B of FIG. 26.

DETAILED DESCRIPTION

Figure 6:
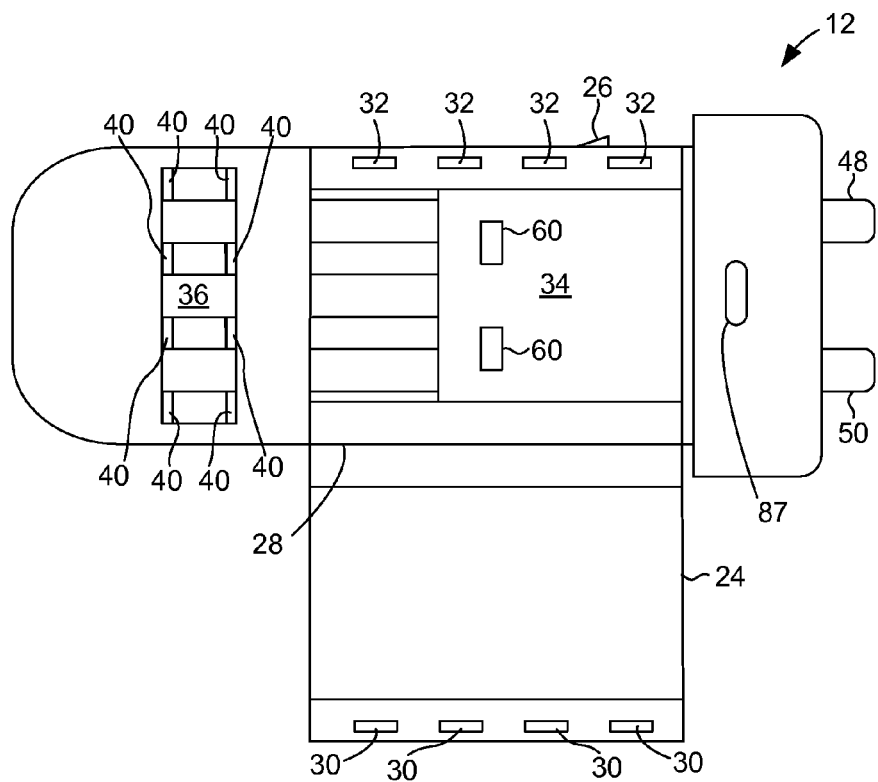
FIG. 6 is a top plan view of the body portion of the optical fiber connector of FIGS. 1-5, showing the hinged lid or cover in an open position, with the submodule removed to reveal the submodule mounting recess.

As illustrated in FIGS. 1-3, in an illustrative or exemplary embodiment of the invention, an optical fiber connector 10 includes a body portion 12 and a cover portion 14. Body portion 12 and cover portion 14 can be made of, for example, a molded plastic material. Optical fiber connector 10 has a generally elongated, rectangular shape, elongated along a longitudinal axis 16 between opposing forward and rearward ends. The forward end of body portion 12 as described below defines a pluggable optical fiber port 18. Although in the exemplary embodiment optical fiber connector 10 defines a plug-like device that can be plugged into a mating socket-like device (not shown), more generally the term "pluggable" is intended only to refer to a pluggable relationship between two such elements and is not intended to imply any other structural characteristics. The rearward end of body portion 12 has an opening 20 through which one or more optical fibers (not shown) can be threaded when optical fiber connector 10 is used as described below.

As illustrated in FIGS. 4-5, optical fiber connector 10 is assembled by inserting a portion of the rearward end of body portion 12 into the forward end of cover portion 14. The outer cross-sectional or profile dimensions of body portion 12 and inner cross-sectional or profile dimensions of the interior 22 of cover portion 14 provide a snug fit between body portion 12 and cover portion 14. Note that the forward-most portion of body portion 12 (i.e., the portion having pluggable optical fiber port 18) does not enter cover portion 14. Body portion 12 can include tabs 26 (FIG. 4) that snap into recesses (not shown) in the interior walls of cover portion 14 to help retain body portion 12 and cover portion 14 together.

As illustrated in FIG. 6, body portion 12 has a hinged lid or cover 24. The hinge 28 on which hinged cover 24 swings with respect to the remainder of body portion 12 can be, for example, a living hinge molded into the surrounding plastic material. Hinged cover 24 includes teeth 30 that engage corresponding slots 32 in body portion 12 when hinged cover 24 is in a closed position (e.g., FIG. 4). In FIG. 6, hinged cover 24 is shown in an open position, revealing a submodule mounting region 34 defined by a recessed region or cavity within body portion 12 that hinged cover 24 covers when in the closed position.

Figure 7:
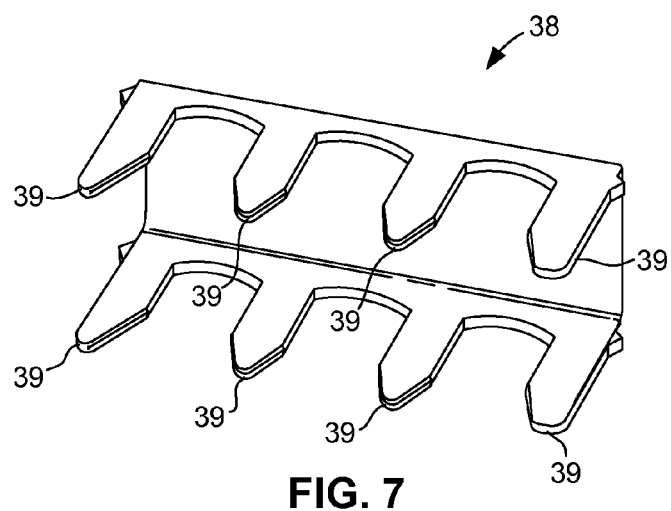
FIG. 7 is a perspective view of a fiber clamp of the body portion of FIG. 6.

Body portion 12 has another recessed region or fiber clamp cavity 36 into which a fiber clamp 38 (FIG. 7) can be inserted as described below. Fiber clamp 38 can be made of metal and has prongs 39 that fit within slots 40 (FIG. 6) in fiber clamp cavity 36.

Figure 8:
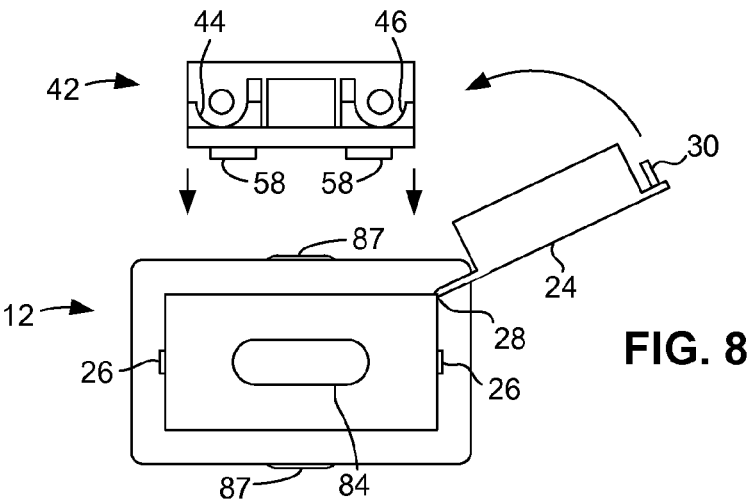
FIG. 8 is a rearward end elevation view illustrating mounting a submodule in the body portion of FIG. 6.
Figure 9:
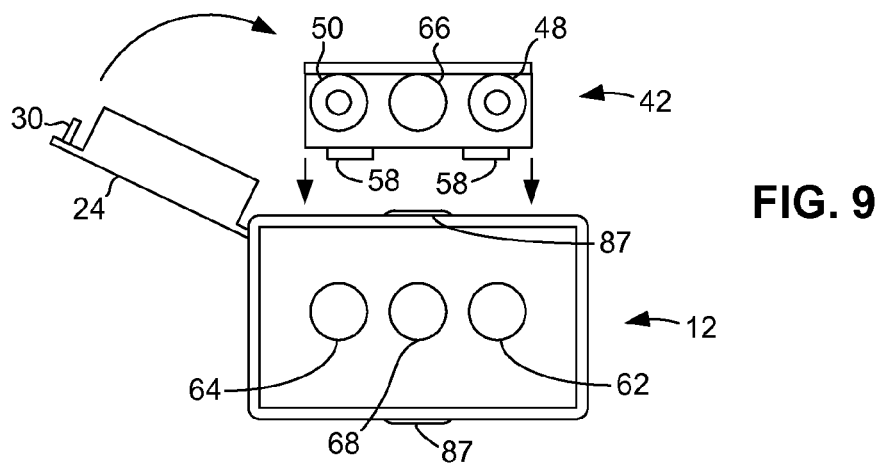
FIG. 9 is a forward end elevation view of the submodule and body portion of FIG. 8.
Figure 10:
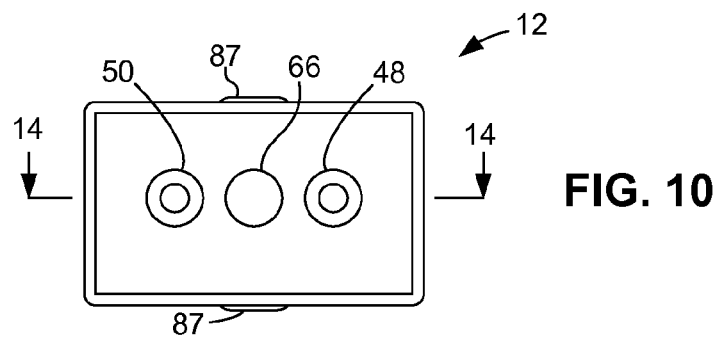
FIG. 10 is similar to FIG. 9, showing the hinged lid or cover in a closed position after the submodule has been mounted in the body portion.

As illustrated in FIGS. 8-10, when hinged cover 24 is in the open position, a user can insert a submodule 42 into submodule mounting region 34. As described in further detail below, a user can select submodule 42 from among a number of such submodules having various configurations. For example, submodule 42 has a configuration that provides the combination of two inputs and two outputs, as described in further detail below. However, as also described below, other configurations from which a user can select can provide, for example, the combination of one input and two outputs (i.e., an optical signal splitter), the combination of two inputs and one output (i.e., an optical signal coupler), the combination of one input and one output, etc. Two or more submodules having different configurations from which a user can choose can be provided as part of a kit along with body portion 12 and cover portion 14.

Figure 11:
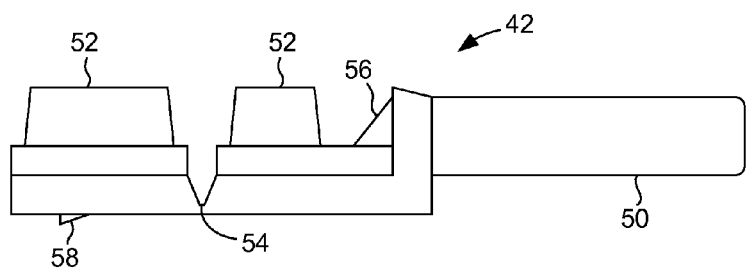
FIG. 11 is a side elevation view of the submodule of FIGS. 8-9.
Figure 12:
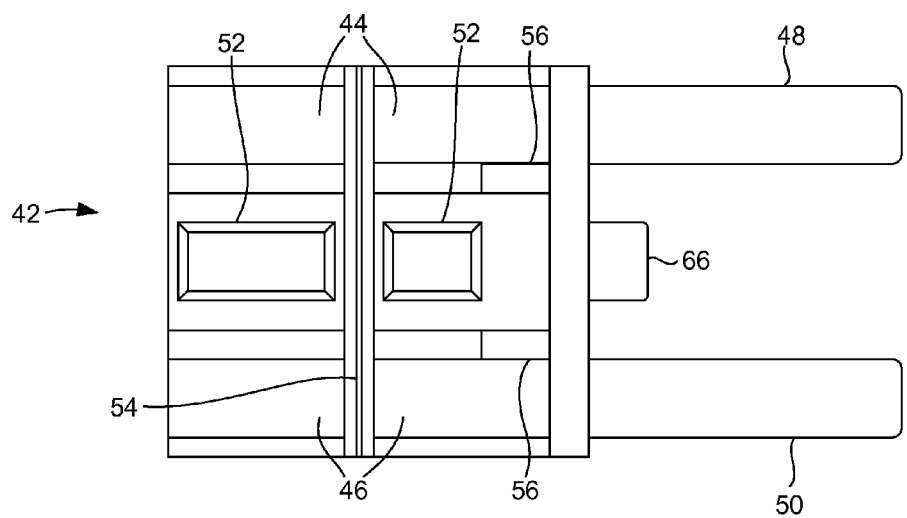
FIG. 12 is a top plan view of the submodule of FIG. 11.

As illustrated in FIGS. 11-12, in submodule 42 a first input is defined by a first submodule fiber guide 44, and a second input is defined by a second submodule fiber guide 46. First and second submodule fiber guides 44 and 46 are substantially trough-shaped (see FIG. 8). First submodule fiber guide 44 is aligned with a first fiber ferrule 48, and second submodule fiber guide 46 is aligned with a second fiber ferrule 50. First and second fiber ferrules 48 and 50 define two outputs.

Submodule 42 also includes block-shaped supports 52 that facilitate secure mounting within submodule mounting region 34 (FIG. 6), as described below. As also described below, a hinge 54 in submodule 42 facilitates insertion of submodule 42 into mounting region 34. Submodule 42 further has triangular buttresses 56 that help maintain alignment between fiber guides 44 and 46 and fiber ferrules 48 and 50. Protrusions 58 extend from beneath submodule 42 and engage corresponding apertures 60 (FIG. 6) in submodule mounting region 34 to help secure submodule 42 in submodule mounting region 34.

With reference again to FIGS. 9-10, when submodule 42 is mounted or seated within submodule mounting region 34 (FIG. 6), first fiber ferrule 48 extends through a first opening 62 in the forward end of body portion 12, and second fiber ferrule 50 extends through a second opening 64 in the forward end of body portion 12. A post 66 between first fiber ferrule 48 and second fiber ferrule 50 similarly extends through a third opening 68 between first opening 62 and second opening 64. Note that when submodule 42 is mounted in this manner, the combination of first fiber ferrule 48 and second fiber ferrule 50 extending through first and second openings 62 and 64 (and no fiber ferrule extending through third opening 68) define pluggable fiber port 18 (FIG. 1) of optical fiber connector 10.

Figure 13:
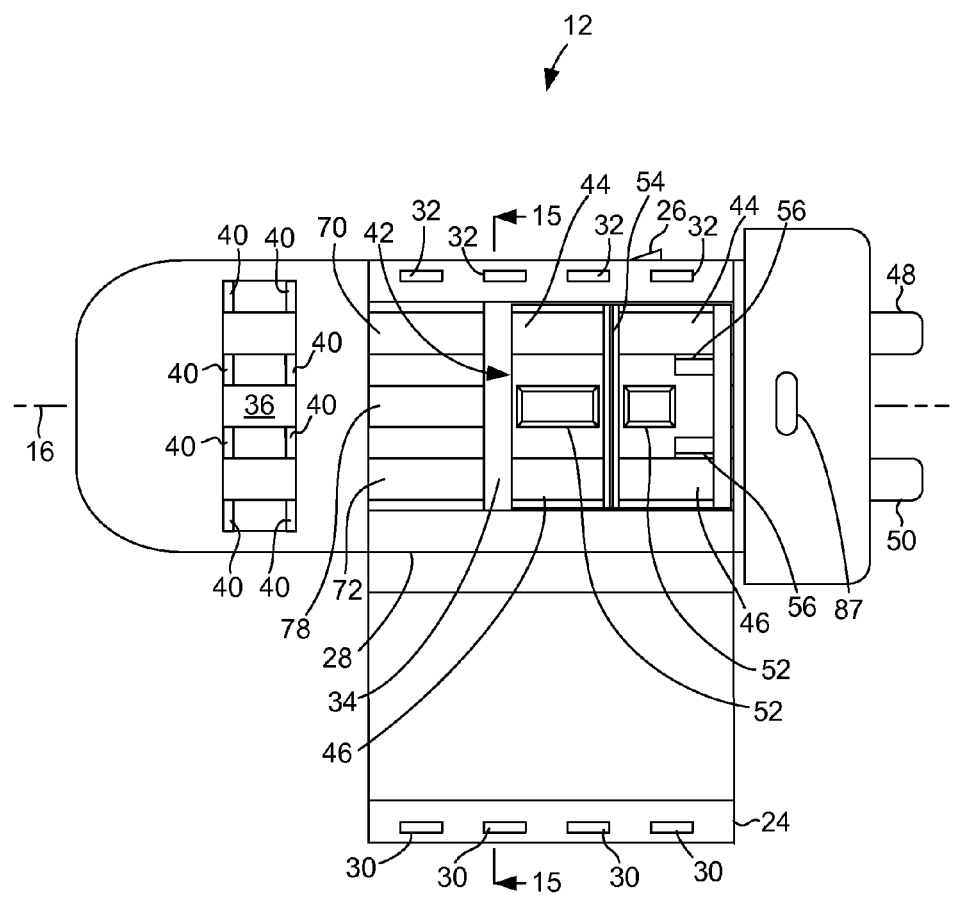
FIG. 13 is a top plan view of the body portion of the optical fiber connector of FIGS. 1-5, showing the hinged lid or cover in an open position, with the submodule mounted in the body portion.
Figure 14:
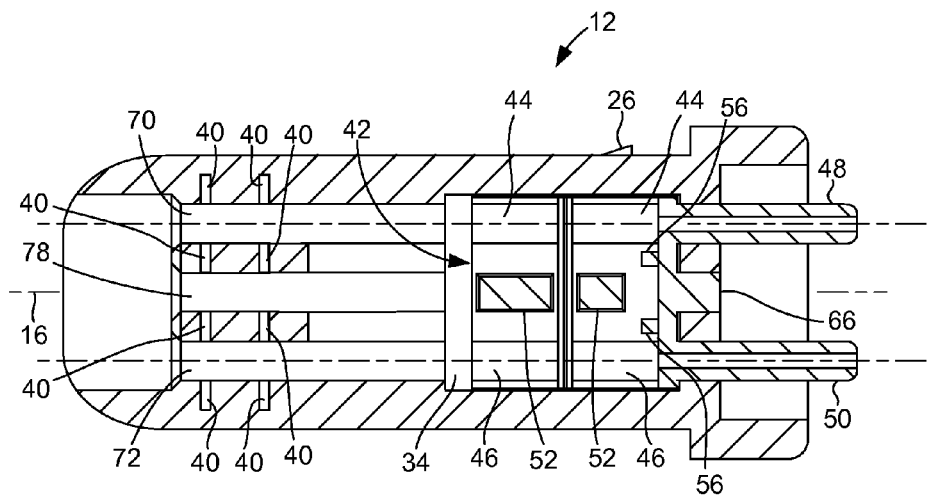
FIG. 14 is a sectional view taken on line 14-14 of FIG. 10.
Figure 15:
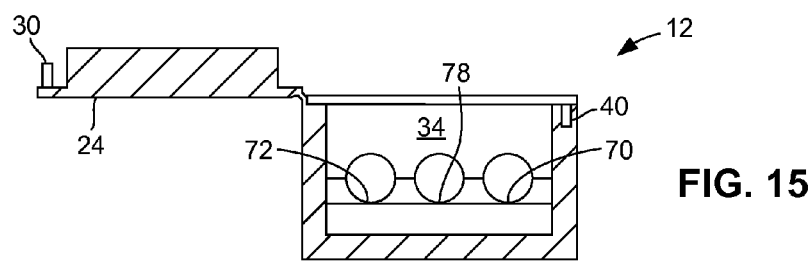
FIG. 15 is a sectional view taken on line 15-15 of FIG. 13.
Figure 17:
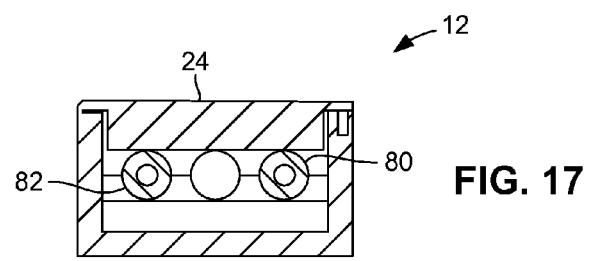
FIG. 17 is a sectional view taken on line 17-17 of FIG. 16, but showing the hinged lid or cover in a closed position.
Figure 16:
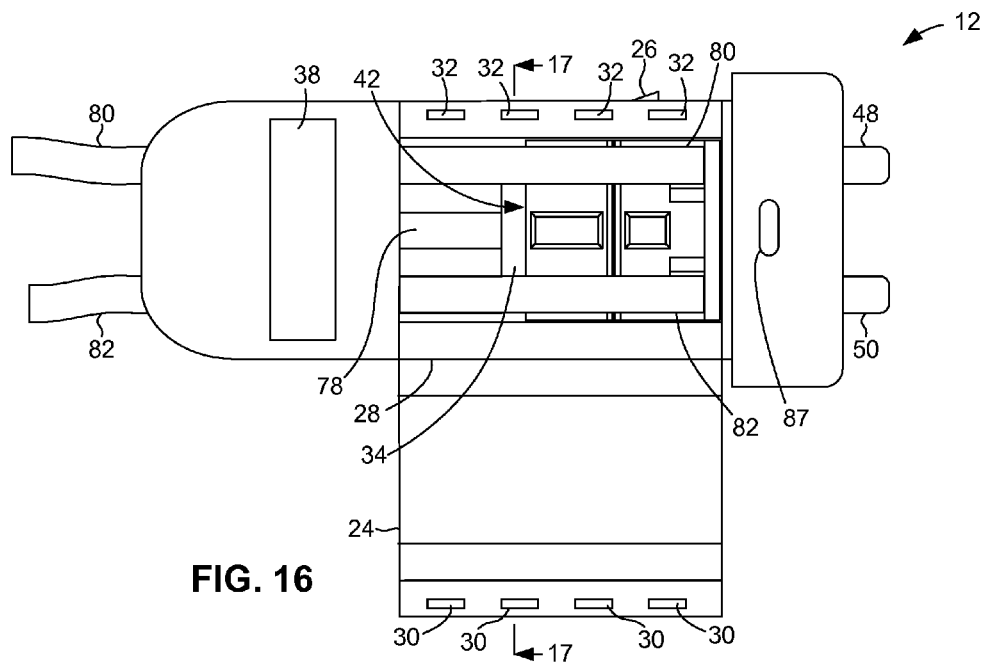
FIG. 16 is similar to FIG. 13, but showing a fiber network comprising two optical fibers installed in the optical fiber connector.
Figure 18:
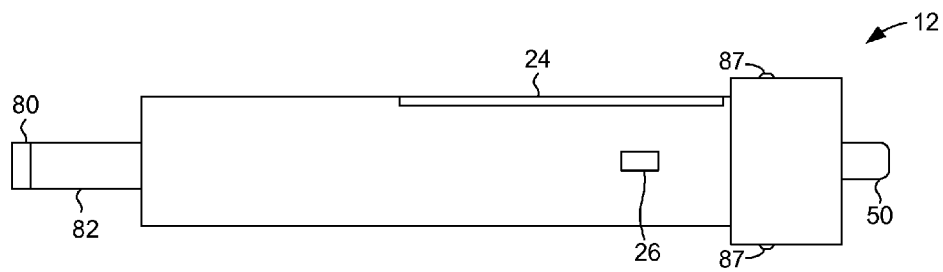
FIG. 18 is a side elevation view of the assembly of FIG. 16, showing the hinged lid or cover in a closed position.
Figure 19:
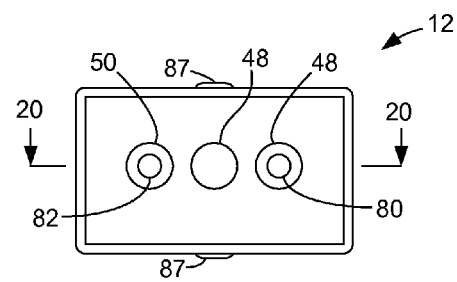
FIG. 19 is a forward end elevation view of the assembly of FIG. 18.
Figure 20:
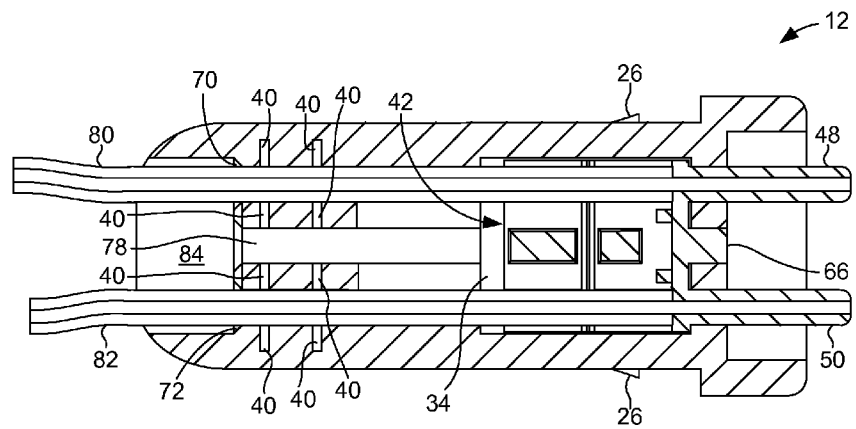
FIG. 20 is a sectional view taken on line 20-20 of FIG. 19.

The mounting of submodule 42 in body portion 12 is further illustrated in FIGS. 13-14. Note that first submodule fiber guide 44 is aligned with a first body fiber guide 70 in body portion 12, and second submodule fiber guide 46 is aligned with a second body fiber guide 72 in body portion 12. Within submodule mounting region 34 and fiber clamp cavity 36, first body fiber guide 70 and second body fiber guide 72 have trough-shaped bottom walls, similar to the bottom walls of first submodule fiber guide 44 and second submodule fiber guide 46. Also note that first submodule fiber guide 44 is aligned with the portion of pluggable optical fiber port 18 (FIG. 1) defined by first fiber ferrule 48, and second submodule fiber guide 46 is aligned with the portion of pluggable optical fiber port 18 (FIG. 1) defined by second fiber ferrule 50. It can further be noted that first body fiber guide 70, first submodule fiber guide 44, and first fiber ferrule 48 are all aligned along a first axis that corresponds to (i.e., is parallel to) longitudinal axis 16. Likewise, second body fiber guide 72, second submodule fiber guide 46, and second fiber ferrule 50 are all aligned along a second axis that corresponds to (i.e., is parallel to) longitudinal axis 16. Body portion 12 includes a third body fiber guide 78, but it is not aligned with any submodule fiber guide in this embodiment (i.e., vis-a-vis the configuration of submodule 42). Correspondingly in the submodule configuration of this embodiment, it can be noted that third opening 68 (FIG. 10) does not have any fiber ferrule extending through it but rather has post 66 extending through it.

With reference to FIGS. 16-20, a first optical fiber 80 is installed or mounted along a continuous optical path that includes first body fiber guide 70, first submodule fiber guide 44 (FIG. 14), and the portion of pluggable optical fiber port 18 (FIG. 1) defined by first fiber ferrule 48. Likewise, a second optical fiber 82 is installed or mounted along a continuous optical path that includes second body fiber guide 72, second submodule fiber guide 46 (FIG. 14), and the portion of pluggable optical fiber port 18 (FIG. 1) defined by second fiber ferrule 50.

First optical fiber 80 and second optical fiber 82 can be, for example, plastic optical fibers having buffer coatings. Fiber clamp 38 (FIG. 16) is inserted into fiber clamp cavity 36 such that prongs 40 (FIG. 7) enter slots 40 (FIG. 6), and first and second optical fibers 80 and 82 extend through the passages between pairs of adjacent prongs 40. When fiber clamp 38 is fully inserted, first and second optical fibers 80 and 82 are clamped within these passages. Sharp edges of the pairs of adjacent prongs cut into the buffer coatings of first and second optical fibers 80 and 82 and thereby help secure them against undesirable longitudinal movement. Note in FIG. 20 that only the optical portions (i.e., the core and cladding) of first and second optical fibers 80 and 82 are retained within first and second fiber ferrules 48 and 50. That is, the end portions of first and second optical fibers 80 and 82 that are retained within first and second fiber ferrules 48 and 50 are stripped of their buffer coatings. First and second optical fibers 80 and 82 extend through an opening 84 (FIG. 8) in the rearward end of body portion 12.

Figure 21:
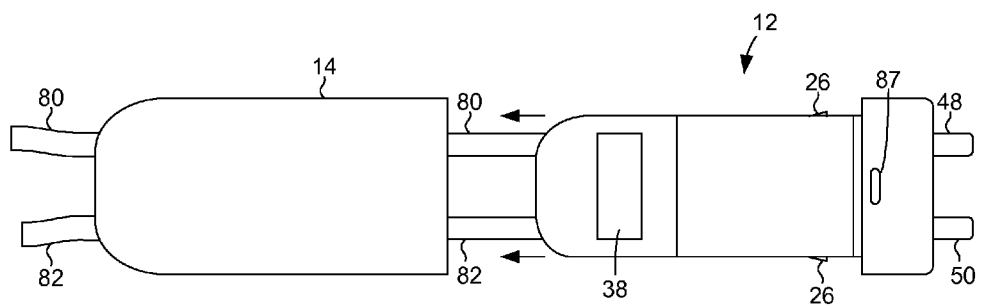
FIG. 21 is a top plan view similar to FIG. 4, illustrating assembly of the body portion of FIGS. 18-19 and the cover portion to produce an optical fiber connector with a fiber network installed.

As illustrated in FIG. 21, when first and second optical fibers 80 and 82 have been installed or mounted in the above-described manner and clamped in place with fiber clamp 38, hinged cover 24 can be closed, and the assembly comprising body portion 12 can be inserted into cover portion 14. Tabs 26 engage corresponding openings (not shown) in the sides of cover portion 14 to retain body portion 12 and cover portion 14 together. The resulting optical fiber connector 10, with first and second optical fibers 80 and 82 mounted therein, is shown in FIG. 22.

Figure 22:
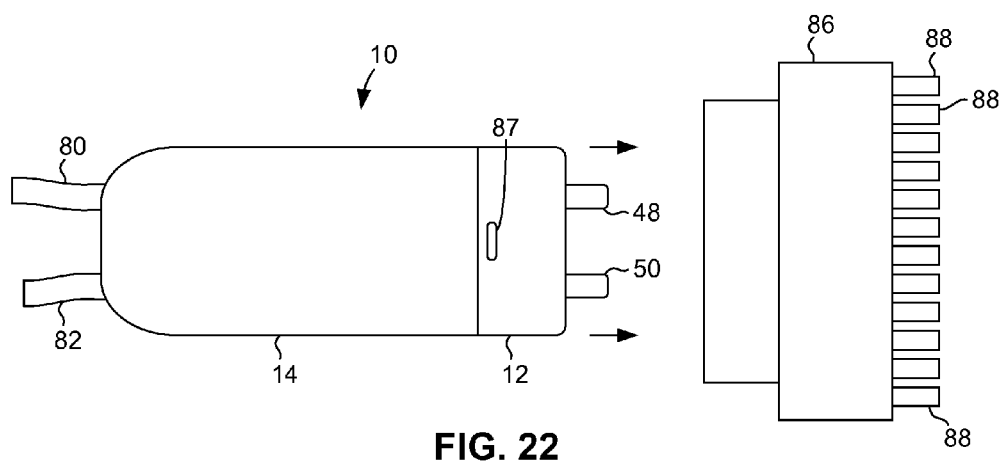
FIG. 22 is a top plan view illustrating plugging the optical fiber connector of FIG. 19 into an opto-electronic module.
Figure 23:
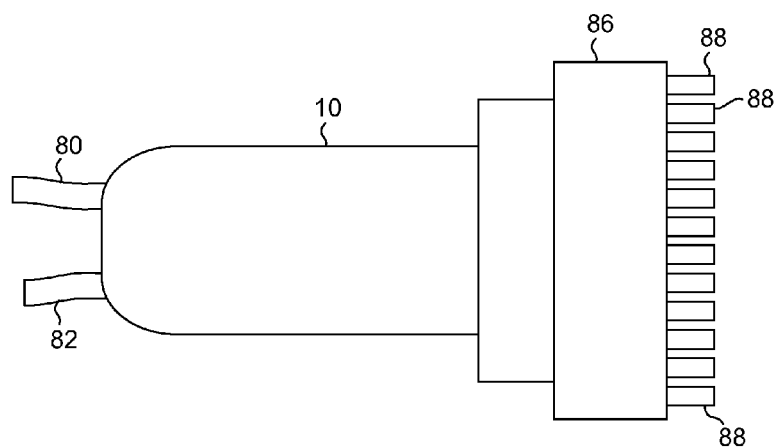
FIG. 23 is a top plan view of the assembled optical link defined by the optical fiber connector and opto-electronic module of FIG. 22.

As illustrated in FIGS. 22-23, optical fiber connector 10 can be plugged into an opto-electronic transceiver 86 or similar opto-electronic device. Although not shown for purposes of clarity, opto-electronic transceiver 86 includes optical-to-electrical signal conversion circuitry as well as electrical-to-optical signal conversion circuitry. Optical signals are coupled between optical fiber connector 10 and opto-electronic transceiver 86 through the ends of first and second optical fibers 80 and 82 retained in first and second fiber ferrules 48 and 50, respectively. That is, pluggable optical fiber port 18 provides an optical signal interface with opto-electronic transceiver 86. As optical fiber connector 10 is plugged into opto-electronic transceiver 86, bumps 87 on the forward end of body portion 12 snap into a recesses (not shown) in opto-electronic transceiver 86 to help secure optical fiber connector 10 to opto-electronic transceiver 86. Opto-electronic transceiver 86 includes electrical contacts 88 for interfacing with an external electronic system (not shown), such as a switching system or processing system.

Figure 24:
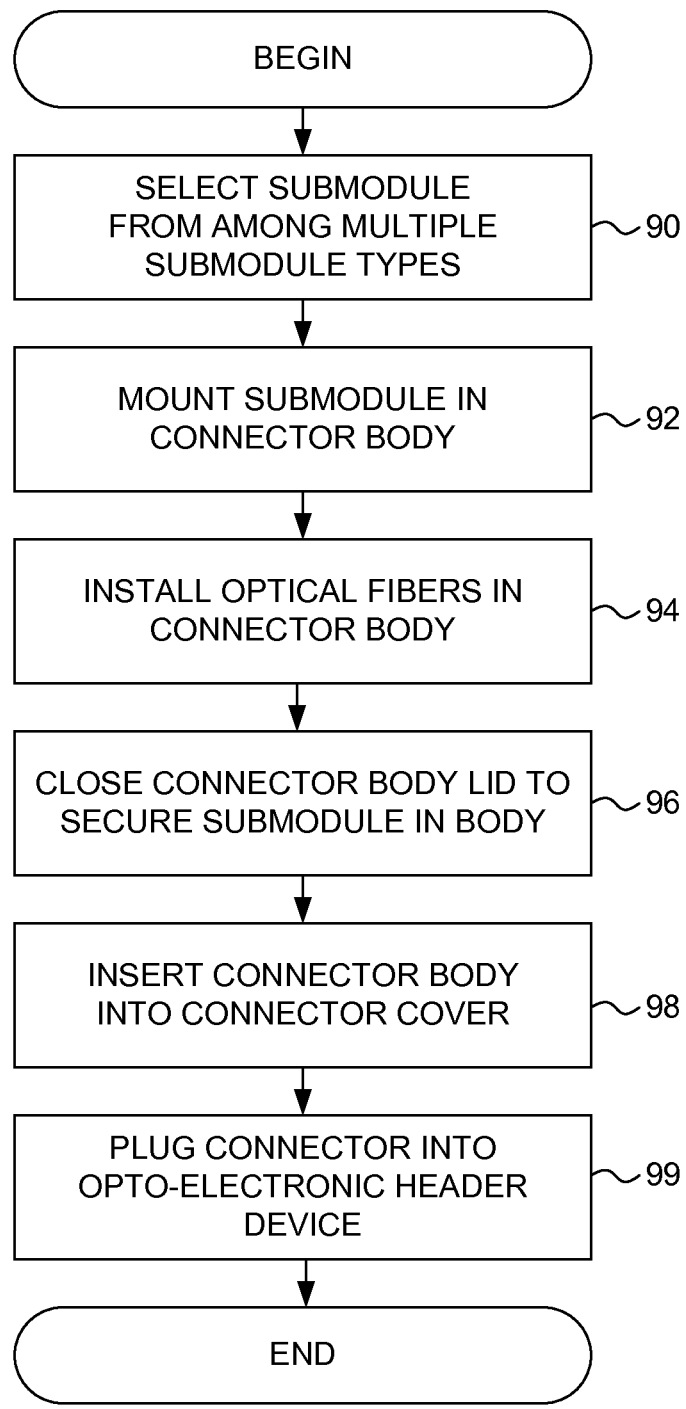
FIG. 24 is a flow diagram illustrating a method for connecting a fiber network using the optical fiber connector of FIGS. 1-23.

As illustrated in FIG. 24, a method for connecting a fiber network comprising at least one optical fiber using an optical fiber connector such as the above-described optical fiber connector 10 can be described as follows. As indicated by block 90, a user can select from among a number of different submodule types or configurations. The above-described submodule 42 has one such submodule configuration. Other submodule configurations are described below with regard to other embodiments.

As indicated by block 92, a user can mount the selected submodule (e.g., submodule 42) in body portion 12. Body portion 12 must first be separated from cover portion 14 to access submodule mounting region 34 (FIG. 6). The user can then lower submodule 42 into the recessed area or cavity defined by submodule mounting region 34 and push submodule 42 toward the forward end of body portion 12 until fiber ferrules 48 and 50 extend through openings 62 and 64, respectively (FIGS. 8-10). Note that to fit submodule 42 into submodule region 34 in this manner, the user may need to bend submodule 42 slightly on hinge 54 before pushing it forward. As submodule 42 is pushed further forward, submodule 42 has space to lay flat against the bottom of submodule mounting region 42, and submodule 42 bends again on hinge 54 to return to its original flat state. In other words, hinge 54 is only involved in the initial insertion of submodule 42 into submodule mounting region 34.

As indicated by block 94, a user can install one or more optical fibers. As described herein with regard to exemplary embodiments, one or more optical fibers are installed or routed along a continuous path that includes one or more of body fiber guides 70, 72 and 78, at least one of submodule fiber guides 44 and 46 (or, in other embodiments, other such submodule fiber guides), and pluggable optical fiber port 18. The continuous paths among these structures can be linear, as in the above-described optical fiber connector 10 (see FIG. 14). Alternatively, the continuous paths can include curved, as described below. Although not shown in FIG. 24, a user also inserts fiber clamp 38 as described above to secure the one or more optical fibers. It should be understood that although the actions described herein are described as being performed by "a user," such a user can be assisted by tools or automated machines. For example, a machine (not shown) can be used to draw optical fibers through fiber ferrules 48 and 50. Although not shown for purposes of clarity, fiber ferrules 48 and 50 can include slots along their lengths to facilitate such an automated operation.

As indicated by block 96, once one or more optical fibers have been installed, the user can secure a release mechanism, such as hinged cover 24, to secure the selected submodule (e.g., submodule 42) in submodule mounting region 34. In the above-described embodiment hinged cover 24 presses against block-shaped supports 52 (see FIGS. 13, 14 and 16) to help hold submodule 42 in place. Note that opening hinged cover 24 accordingly releases submodule 42, enabling a user to lift it out of submodule mounting region 34. Submodule 42 is not secured by fasteners or adhesives, but rather only by the user-operable releasable mounting mechanism described above. Also note in FIG. 17 that hinged cover 24 presses against first and second optical fibers 80 and 82 to help hold them in place.

As indicated by block 98, the user inserts the forward end of body portion 12 into the rearward end of cover portion 14 (see FIG. 19) to secure the assembly together. As indicated by block 99, a user can plug together or otherwise connect the assembled optical connector 10 to opto-electronic module 86 (see FIGS. 20-21).

As illustrated in FIGS. 25-28, in another exemplary embodiment an optical fiber connector 100 has a configuration that is different from the configuration of the above-described optical fiber connector 10. Optical fiber connector 100 is configured as a splitter and accordingly has one input defined by an optical fiber 102 and two outputs defined by first and second fiber ferrules 104 and 106. It should be understood that the terms "input" and "output" are used only for convenience to refer to opposite ends of optical fiber connector 10 and are not intended to imply a direction of optical signal propagation. Indeed, in some configurations signals can be carried bidirectionally on an optical fiber.

As in the above-described embodiment, optical fiber connector 100 comprises a body portion 108 and a cover portion 110. Unless otherwise stated below, elements of optical fiber connector 100 are the same as those of the above-described optical fiber connector 10. For example, but for the submodule 112 (FIG. 28) that is mounted in body portion 108, body portion 108 is identical to above-described body portion 12. With regard to some specific elements: a first body fiber guide 70' is identical to first body fiber guide 70; a second body fiber guide 72' is identical to second body fiber guide 72; a third body fiber guide 78' is identical to third body fiber guide 78; and a submodule mounting region 34' is identical to submodule mounting region 34. Submodule 112 is mounted in submodule mounting region 34' in the same manner as described above with regard to the mounting of submodule 42 in submodule mounting region 34.

Figure 25:
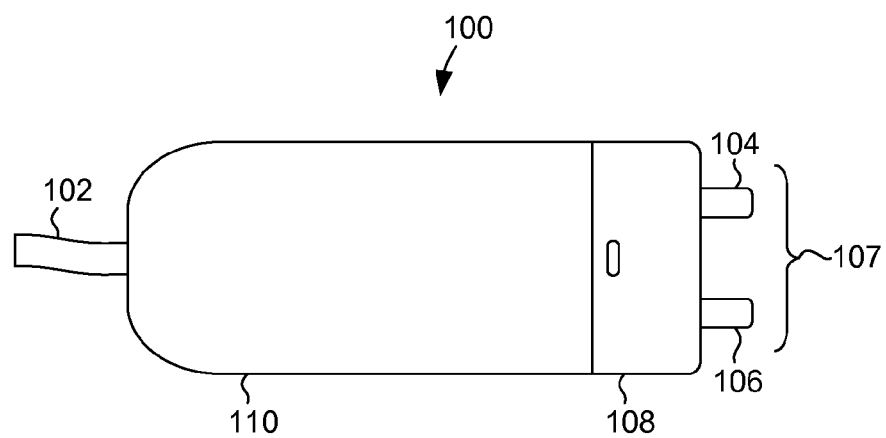
FIG. 25 is a top plan view of an alternative embodiment of an optical fiber connector configured as a coupler.
Figure 26:
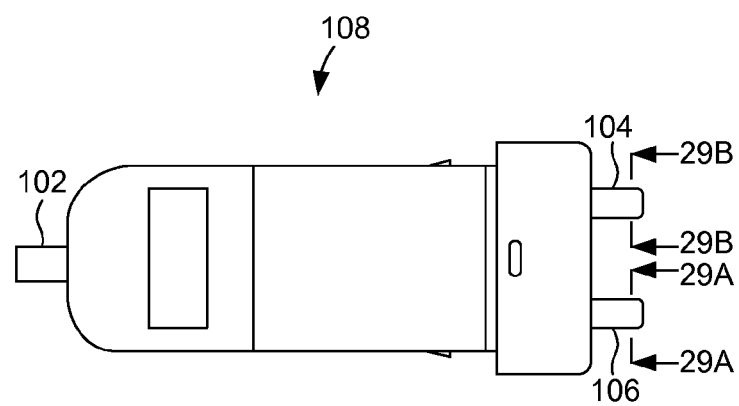
FIG. 26 is a top plan view of the body portion of the optical fiber connector of FIG. 25.
Figure 30:
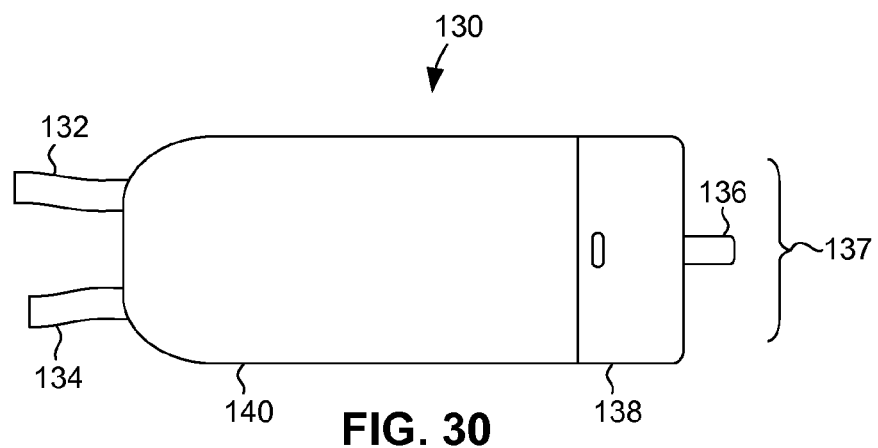
FIG. 30 is a top plan view of another alternative embodiment of an optical fiber connector configured as a splitter.
Figure 31:
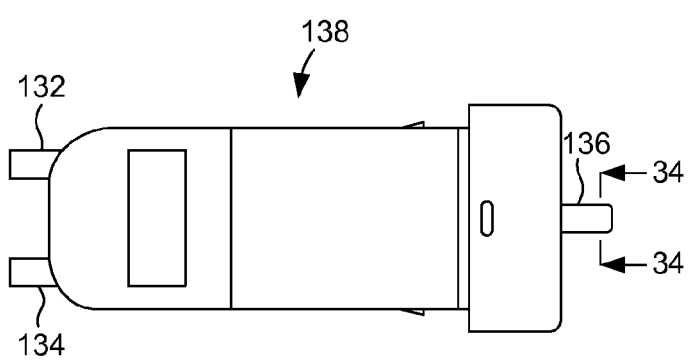
FIG. 31 is a top plan view of the body portion of the optical fiber connector of FIG. 30.
Figure 32:
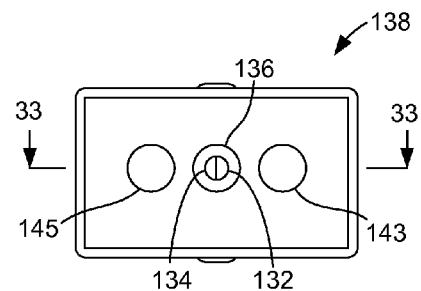
FIG. 32 is a forward end view of the body portion of FIG. 31.

Submodule 112 also has a post 111 between first and second fiber ferrules 104 and 106 that extends through an opening (not separately shown) in the forward end of body portion 108 between the openings (not separately shown) through which first and second fiber ferrules 104 and 106 extend. The combination of first and second fiber ferrules 104 and 106 extending through respective openings in the forward end of body portion 108 (and no fiber ferrule extending through the opening between them) define a pluggable fiber port 107 (FIG. 25).

As illustrated in FIG. 28, submodule 112 includes a hinge 114 and triangular buttresses 116. Submodule 112 also includes block-shaped supports 118 and 120. In this embodiment, block-shaped supports 118 and 120 not only help retain submodule 112 within submodule mounting region 34' when the hinged cover (not shown for purposes of clarity) is in the closed position but also have slots through which two optical fibers 124 and 126 are routed. Each of optical fibers 124 and 126 has a D-shaped cross section (FIGS. 29A-B). (The term "D-shaped" means substantially semicircular, where the straight side of the letter "D" corresponds to the diameter of a semicircle and thus to the flat side of a correspondingly shaped fiber.) By means of their slotted structure, block-shaped supports 118 and 120 define a path or routing for a fiber network comprising optical fibers 124 and 126. Note that despite their D-shaped cross section, each of optical fibers 124 and 126 is a complete optical fiber having a core and cladding, though the core and cladding are not separately shown for purposes of clarity.

Submodule 112 has a third fiber ferrule 128 extending rearward from block-shaped support 118. Within third fiber ferrule 128, the flat sides of optical fibers 124 and 126 are bonded together. Optical fiber 102 abuts third fiber ferrule 128 and is aligned with body fiber guide 78' because third fiber ferrule 128, serving as a submodule fiber guide, is aligned with body fiber guide 78'. The end face of optical fiber 102 is attached to the rearward face of third fiber ferrule 128, such as with a suitable adhesive (e.g., an optical epoxy). On the forward side of block-shaped support 118, optical fibers 124 and 126 split away from each other. Block-shaped support 120 has two curving slots, one that guides or routes optical fiber 124 and another that guides or routes optical fiber 126. Each of these two slots serves as a submodule fiber guide and is aligned with one of fiber ferrules 104 and 106. Note that body fiber guides 70' and 72' are not aligned with any of these submodule fiber guides. The fiber routing defined by block-shaped supports 118 and 120 is that of a (fiber) coupler, as the routing or path is generally Y-shaped, with an output portion where optical fibers 124 and 126 are bonded together within third fiber ferrule 128, and two input branch portions where optical fibers 124 and 126 diverge away from each other. The coupler routing is defined not only by the output portion and two input branch portions but also by first and second fiber ferrules 104 and 106, as optical fiber 124 is retained within first fiber ferrule 104, and optical fiber 126 is retained within second fiber ferrule 106. Note that despite their D-shaped cross sections, optical fibers 124 and 126 are optically centered within their respective fiber ferrules 104 and 106. It should be understood that the term "coupler" is used only for convenience to refer to the Y-shaped routing and is not intended to imply a direction of optical signal propagation. It can also be noted that optical fibers 124 and 126 can be oriented with their flat sides in any suitable angular orientation. Although in this exemplary embodiment optical fiber 102 has a conventional circular cross-sectional shape, in other embodiments (not shown) it can have a D-shaped cross section like optical fibers 124 and 126.

Figure 33:
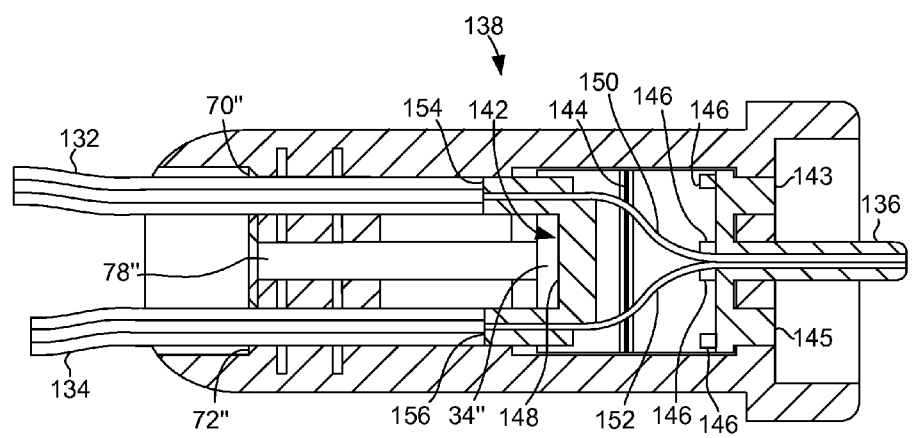
FIG. 33 is a sectional view taken on line 33-33 of FIG. 32.
Figure 34:
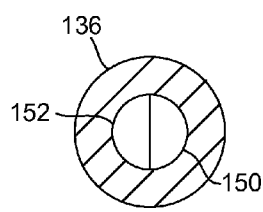
FIG. 34 is sectional view taken on line 34-34 of FIG. 31.

As illustrated in FIGS. 30-34, in another exemplary embodiment an optical fiber connector 130 has a configuration that is different from the configurations of the above-described optical fiber connectors 10 and 100. Optical fiber connector 130 is configured as a splitter and accordingly has two outputs defined by optical fibers 132 and 134 and one input defined by a first fiber ferrule 136. In this embodiment, a fiber network routed through a submodule 142 (FIG. 33) comprises two optical fibers 150 and 152, each having a D-shaped cross-sectional shape. As illustrated in FIG. 34, the flat sides of optical fibers 150 and 152 are bonded together within first fiber ferrule 136. As in the above-described embodiment, optical fibers 150 and 152 can be oriented with their flat sides in any suitable angular orientation.

As in the above-described embodiments, optical fiber connector 130 comprises a body portion 138 and a cover portion 140. Unless otherwise stated below, elements of optical fiber connector 130 are the same as those of the above-described optical fiber connectors 10 and 100. For example, but for the submodule 142 (FIG. 33) mounted in body portion 138, body portion 138 is identical to above-described body portions 12 and 108. With regard to some specific elements: a first body fiber guide 70" is identical to first body fiber guide 70; a second body fiber guide 72" is identical to second body fiber guide 72; a third body fiber guide 78" is identical to third body fiber guide 78; and a submodule mounting region 34" is identical to submodule mounting region 34. Submodule 142 is mounted in submodule mounting region 34" in the same manner as described above with regard to the mounting of submodule 42 in submodule mounting region 34.

First fiber ferrule 136 of submodule 142 extends through an opening (not separately shown) in the forward end of body portion 138. Submodule 142 also has two posts 143 and 145 that extend through similar openings (not separately shown) in the forward end of body portion 138 on either side of the opening through which first fiber ferrule 136 extends. The combination of first fiber ferrule 136 extending through an opening in the forward end of body portion 138 and no fiber ferrules extending through the openings on either side of first fiber ferrule 136 defines a pluggable fiber port 137.

As illustrated in FIG. 33, submodule 142 includes a hinge 144 and triangular buttresses 146. Submodule 142 also includes a block-shaped support 148. Submodule 142 further includes second and third fiber ferrules 154 and 156, respectively, which extend rearward from block-shaped support 148. In this embodiment, optical fibers 132 and 134 abut second and third fiber ferrules 154 and 156, respectively, and can be secured with a suitable optical adhesive. Although in this exemplary embodiment optical fibers 132 and 134 have conventional circular cross-sectional shapes, in other embodiments (not shown) they can have D-shaped cross sections like optical fibers 150 and 152.

The portions of the fiber network comprising optical fibers 150 and 152 are routed through second and third fiber ferrules 154 and 156 and converge between a pair of triangular buttresses 146. Second and third fiber ferrules 154 and 156 and this pair of triangular buttresses 146 thus define a path or routing for these portions of the fiber network. Note that second and third fiber ferrules 154 and 156 help guide or route these portions of the fiber network and thus serve as submodule fiber guides that are aligned with body fiber guides 70" and 72", respectively. Similarly, the pair of triangular buttresses 146 that guide or route optical fibers 150 and 152 serve as another submodule fiber guide that is aligned with first fiber ferrule 136. Note that body fiber guide 78" is not aligned with any of these submodule fiber guides.

Optical fibers 150 and 152 converge or merge where they are retained within first fiber ferrule 136. That is, within first fiber ferrule 136 optical fibers 150 and 152 are arranged with their flat sides bonded together. In this embodiment, the fiber routing defined second and third fiber ferrules 154 and 156 and the pair of triangular buttresses 146 through which optical fibers 150 and 152 are routed is that of a (fiber) splitter, as the routing or path is generally Y-shaped, with two output portions where optical fibers 150 and 152 are routed between submodule 142 and the rearward end of body portion 138, and one input portion where optical fibers 150 and 152 merge within first fiber ferrule 136. The splitter routing thus also includes first fiber ferrule 136. It should be understood that the term "splitter" is used only for convenience to refer to the Y-shaped routing and is not intended to imply a direction of optical signal propagation.

Figure 35A:
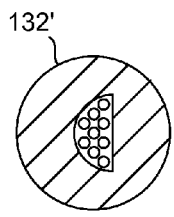
FIG. 35A shows an alternative fiber having multiple cores.
Figure 35B:
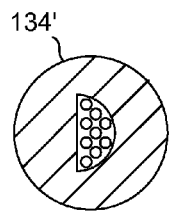
FIG. 35B shows another alternative fiber having multiple cores.
Figure 36:
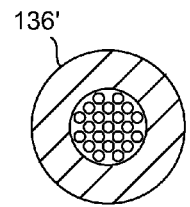
FIG. 36 shows still another alternative fiber having multiple cores.

Although in the exemplary embodiment described above with regard to FIGS. 30-34 each of optical fibers 132, 134, 150 and 152 has only a single core, in other embodiments (not shown) similarly routed fibers can have multiple cores. For example, as shown in FIGS. 35A-B, optical fibers 132' and 134' that are routed in a manner similar to the above-described routing of optical fibers 132 and 134, respectively, can have multiple cores. Similarly, as shown in FIG. 36, an optical fiber 136' that is routed in a manner similar to the above-described routing of optical fiber 136 can have multiple cores. In such an embodiment, the cores of optical fibers 132' and 134' would be optically aligned with the cores of optical fiber 136'. Likewise, although in the exemplary embodiment described above with regard to FIGS. 25-29 each of optical fibers 102, 124 and 126 has only a single core, in other embodiments (not shown) similarly routed fibers can have multiple cores. Using multi-core fiber plastic optical fiber can help minimize coupling loss in the embodiment described above with regard to FIGS. 25-29 or splitting loss in the embodiment described above with regard to FIGS. 30-34.

One or more illustrative embodiments of the invention have been described above. However, it is to be understood that the invention is defined by the appended claims and is not limited to the specific embodiments described.

What is claimed is:

1. An optical fiber connector, comprising:
a connector body elongated in a direction of a longitudinal axis between a first end and a second end, the connector body having a submodule mounting region between the first end and the second end, the first end of the connector body having a pluggable optical fiber port comprising a first opening, a second opening and a third opening, the second end of the connector body having a first body fiber guide, a second body fiber guide, and a third body fiber guide; and
a submodule releasably mounted in the submodule mounting region by a movable retainer latch, the submodule having one of a coupler routing and a splitter routing, the submodule having the coupler routing having a coupler output branch portion aligned with the third body fiber guide, a first coupler input branch portion terminating at a first coupler input fiber ferrule extending through the first opening, and a second coupler input branch portion terminating at a second coupler input fiber ferrule extending through the second opening, the submodule having the splitter routing having a first splitter output branch portion aligned with the first body fiber guide, a second splitter output branch portion aligned with the second body fiber guide, and a splitter input branch portion terminating at a splitter input fiber ferrule extending through the third opening.

2. The optical fiber connector of claim 1, wherein the movable retainer latch comprises a hinged cover over the recess, and the submodule is clamped between the hinged cover and a bottom of the recess.

3. The optical fiber connector of claim 1, wherein the connector body comprises a fiber clamp having a plurality of prongs extending into a corresponding plurality of slots, the fiber clamp further having a plurality of fiber-gripping passages between the prongs, each fiber-gripping passage aligned with a corresponding body fiber guide.

4. The optical fiber connector of claim 1, wherein:
the first and second body fiber guides are not aligned with any submodule fiber guide of the submodule having the coupler routing; and
the third opening in the first end of the connector body does not have any fiber ferrule of the submodule having the coupler routing extending therethrough.

5. The optical fiber connector of claim 4, wherein:
the third body fiber guide is disposed between the first body fiber guide and the second body fiber guide; and
the third opening of the pluggable optical fiber port is disposed between the first opening and the second opening.

6. The optical fiber connector of claim 1, wherein:
the third body fiber guide is not aligned with any submodule fiber guide of the submodule having the splitter routing; and
the first and second openings in the first end of the connector body do not have any fiber ferrule of the submodule having the splitter routing extending therethrough.

7. The optical fiber connector of claim 6, wherein:
the third body fiber guide is disposed between the first body fiber guide and the second body fiber guide; and
the third opening of the pluggable optical fiber port is disposed between the first opening and the second opening.

8. The optical fiber connector of claim 1, further comprising an opto-electronic transceiver module pluggably connectable to the pluggable optical fiber port.

9. A method for connecting a fiber network comprising at least one optical fiber using a connector comprising a connector body and a submodule, the connector body elongated in a direction of a longitudinal axis between a first end and a second end, the connector body having a submodule mounting region between the first end and second end, the first end of the connector body having a pluggable optical fiber port comprising a first opening, a second opening and a third opening, the second end of the connector body having a first body fiber guide, a second body fiber guide and a third body fiber guide, the submodule releasably mounted in the submodule mounting region by a movable retainer latch, the method comprising:
selecting a submodule from among a submodule having a coupler routing and a submodule having a splitter routing;
mounting the submodule in the submodule mounting region, wherein mounting the submodule having the coupler routing comprises aligning a coupler output branch portion with the third body fiber guide, extending a first coupler input fiber ferrule through the first opening, and extending a second coupler input fiber ferrule through the second opening, and wherein mounting the submodule having the splitter routing comprises aligning a first splitter output branch portion with the first body fiber guide, aligning a second splitter output branch portion with the second body fiber guide, and extending a splitter input fiber ferrule through the third opening;
installing at least one optical fiber along a continuous optical path including at least one of the body fiber guides, at least one branch portion of the submodule, and the pluggable optical fiber port; and
moving the movable retainer latch from the released position to the latched position after installing the at least one optical fiber.

10. The method of claim 9, wherein moving the movable retainer latch comprises swinging a hinged cover over the recess to clamp the submodule between the hinged cover and a bottom of the recess.

11. The method of claim 9, wherein installing at least one optical fiber comprises installing a fiber clamp over the least one optical fiber, the fiber clamp having a plurality of prongs extending into a corresponding plurality of slots, the fiber clamp further having a plurality of fiber-gripping passages between the prongs, the at least one optical fiber extending through each fiber-gripping passage.

12. The method of claim 9, further comprising plugging the optical fiber port and an opto-electronic transceiver module together.

* * * * *